United States Patent
Morifuji

(10) Patent No.: US 8,687,048 B2
(45) Date of Patent: Apr. 1, 2014

(54) IMAGE PROCESSING APPARATUS AND METHOD, AND PROGRAM

(75) Inventor: Takafumi Morifuji, Tokyo (JP)

(73) Assignee: Sony Corporation, Tokyo (JP)

(*) Notice: Subject to any disclaimer, the term of this patent is extended or adjusted under 35 U.S.C. 154(b) by 280 days.

(21) Appl. No.: 13/201,364

(22) PCT Filed: Dec. 17, 2010

(86) PCT No.: PCT/JP2010/072734
§ 371 (c)(1),
(2), (4) Date: Oct. 20, 2011

(87) PCT Pub. No.: WO2011/078066
PCT Pub. Date: Jun. 30, 2011

(65) Prior Publication Data
US 2012/0057001 A1 Mar. 8, 2012

(30) Foreign Application Priority Data
Dec. 25, 2009 (JP) ................ P2009-294548

(51) Int. Cl.
*H04N 13/02* (2006.01)
(52) U.S. Cl.
USPC ................... 348/50; 348/42; 348/43
(58) Field of Classification Search
USPC ............................... 348/42, 43, 50
See application file for complete search history.

(56) References Cited

U.S. PATENT DOCUMENTS

| 5,825,456 A | 10/1998 | Tabata et al. |
| 6,665,003 B1 | 12/2003 | Peleg et al. |
| 2001/0038413 A1* | 11/2001 | Peleg et al. ............ 348/36 |
| 2011/0193861 A1* | 8/2011 | Mashitani et al. ......... 345/419 |

FOREIGN PATENT DOCUMENTS

| JP | 6-225202 | 8/1994 |
| JP | 8-322004 | 12/1996 |
| JP | 2003-524927 | 8/2003 |

* cited by examiner

*Primary Examiner* — Sath V Perungavoor
*Assistant Examiner* — Jeffery Williams
(74) *Attorney, Agent, or Firm* — Finnegan, Henderson, Farabow, Garrett & Dunner, LLP

(57) ABSTRACT

The present invention relates to image processing apparatus and method, and a program which can display a stereoscopic image that provides more natural depth perception. A panoramic image generating section 25-1 generates a panoramic image PR for the right eye by extracting and synthesizing each strip region TRR in a plurality of captured images that are captured successively in the state in which an imaging apparatus ii is moving. A panoramic image generating section 25-2 generates a panoramic image PL for the left eye by extracting and synthesizing each strip region TRL in the plurality of captured images. From the panoramic image PR and the panoramic image PL, a disparity controlling section 26 detects the dominant disparity of these panoramic images, and shifts the entire panoramic images in accordance with the detection result to thereby adjust disparity. A display section 27 simultaneously displays the disparity-adjusted pair of panoramic images, thereby displaying a stereoscopic panoramic image with more natural depth perception. The present invention can be applied to a camera.

7 Claims, 10 Drawing Sheets

IMAGE PROCESSING APPARATUS AND METHOD, AND PROGRAM

TECHNICAL FIELD

The present invention relates to image processing apparatus and method, and a program, in particular, image processing apparatus and method, and a program which make it possible to display a stereoscopic image that provides more natural depth perception.

BACKGROUND ART

In the related art, a technique is known which generates a panoramic image by overlaying and synthesizing a plurality of still images obtained by capturing with an imaging apparatus while panning the imaging apparatus in a predetermined direction (see, for example, PTL 1). Since a panoramic image is an image obtained by arranging and synthesizing a plurality of still images, according to a panoramic image, a region wider than the region in the space to be captured when capturing a single still image can be displayed as a subject.

Also, in the case when a plurality of still images are captured while panning an imaging apparatus in order to obtain a panoramic image, the same subject is sometimes included in several still images. In such a case, since the same subject in different still images is captured from positions that are different from each other, it means that disparity or parallax is produced.

When this is exploited to generate two panoramic images having disparity with respect to each other from a plurality of still images, by simultaneously displaying these panoramic images by the lenticular scheme, the subject to be captured can be displayed stereoscopically. It should be noted that in the following, a stereoscopic image displayed on the basis of two panoramic images will be also referred to as stereoscopic panoramic image.

CITATION LIST

Patent Literature

PTL 1: Japanese Patent No. 3168443

SUMMARY OF INVENTION

Technical Problem

Incidentally, when displaying a stereoscopic panoramic image on a display section, if there is hardly any disparity between two panoramic images that are displayed simultaneously, the main subject in the stereoscopic panoramic image is localized at the display surface of the display section.

At this time, if there is absolutely no disparity for the entire subject between the two panoramic images, the subject in the stereoscopic panoramic image does not appear stereoscopically. However, if disparity exists in a part of the subject, the corresponding part of the subject is localized at a position different from the display surface, and thus a subject that provides stereoscopic perception as a whole is displayed. That is, as long as individual parts of the subject in the two panoramic images have appropriate disparity relative to each other, the subject is displayed stereoscopically.

In contrast, if there is disparity between the two panoramic images, depending on the disparity, the main subject in the stereoscopic panoramic image is localized on the side in front of or behind the display surface as viewed from the observer. In such a case, natural stereoscopic perception may not be obtained. Further, in this case, although the observer is focusing the eyes on the display surface of the display section, the main subject in the stereoscopic panoramic image is localized at a position different from the display surface, causing fatigue of the eyes and brain of the observer.

Normally, between two panoramic images, individual parts of a subject in the panoramic images have different disparities. Hence, no matter at which position the main subject in the panoramic images is localized, the subject in the stereoscopic panoramic image should appear stereoscopically. Therefore, it can be said that two panoramic images having such a disparity that causes the main subject in the stereoscopic panoramic image to be localized at the display surface are a pair of panoramic images having the most appropriate disparity.

However, with the above-described technique, it has been difficult to obtain two panoramic images having appropriate disparity from a plurality of captured still images. Consequently, it has not been possible to display a stereoscopic image with natural depth perception (stereoscopic perception).

The present invention has been made in view of the above circumstances, and accordingly the object of the present invention is to enable display of a stereoscopic image that provides more natural depth perception.

Solution to Problem

An image processing apparatus according to an aspect of the present invention is an image processing apparatus which generates a first synthetic image and a second synthetic image used for displaying a stereoscopic synthetic image and having disparity with respect to each other, on the basis of a plurality of captured images obtained by capturing with imaging means while moving the imaging means, and includes a first synthetic image generating means for generating the first synthetic image by synthesizing each of images in a first strip region of the captured images, a second synthetic image generating means for generating the second synthetic image by synthesizing each of images in a second strip region of the captured images which is different from the first strip region, and disparity controlling means for adjusting the disparity of the first synthetic image and the second synthetic image, by shifting at least one of the first synthetic image and the second synthetic image on the basis of a predetermined amount of shift.

The disparity controlling means can be configured to compute a correlation value indicating a degree of correlation between a region in the first synthetic image and a region in the second synthetic image, detect a dominant disparity of the first synthetic image and the second synthetic image by using the correlation value, and compute the amount of shift that cancels out the dominant disparity.

The disparity controlling means can be configured to compute a difference between the first synthetic image and the second synthetic image as the correlation value, while displacing a position of the second synthetic image with respect to the first synthetic image.

The disparity controlling means can be configured to compute the amount of shift on the basis of a distance between the first strip region and the second strip region in each of the captured images.

An image processing method or a program according to an aspect of the present invention is an image processing method or a program which generates a first synthetic image and a second synthetic image used for displaying a stereoscopic synthetic image and having disparity with respect to each other, on the basis of a plurality of captured images obtained by capturing with imaging means while moving the imaging means, and includes the steps of generating the first synthetic image by synthesizing each of images in a first strip region of the captured images, generating the second synthetic image by synthesizing each of images in a second strip region of the captured images which is different from the first strip region, and adjusting the disparity of the first synthetic image and the second synthetic image, by shifting at least one of the first synthetic image and the second synthetic image on the basis of a predetermined amount of shift.

According to an aspect of the present invention, in image processing which generates a first synthetic image and a second synthetic image used for displaying a stereoscopic synthetic image and having disparity with respect to each other, on the basis of a plurality of captured images obtained by capturing with imaging means while moving the imaging means, the first synthetic image is generated by synthesizing each of images in a first strip region of the captured images, the second synthetic image is generated by synthesizing each of images in a second strip region of the captured images which is different from the first strip region, and the disparity of the first synthetic image and the second synthetic image is adjusted by shifting at least one of the first synthetic image and the second synthetic image on the basis of a predetermined amount of shift.

Advantageous Effects of Invention

According to an aspect of the present invention, a stereoscopic image that provides more natural depth perception can be displayed.

DESCRIPTION OF EMBODIMENTS

Hereinbelow, embodiments to which the present invention is applied will be described with reference to the drawings.

First Embodiment

[Explanation of Stereoscopic Panoramic Image]
An imaging apparatus to which the present invention is applied is formed by, for example, a camera. A stereoscopic panoramic image is generated from a plurality of captured images that are successively captured by the imaging apparatus in the state in which the imaging apparatus is moving. The stereoscopic panoramic image is made up of two panoramic images having disparity.

When the user wishes to have a stereoscopic panoramic image generated by the imaging apparatus, the user operates the imaging apparatus so as to capture captured images that are used for generation of the stereoscopic panoramic image.

Figure 1:
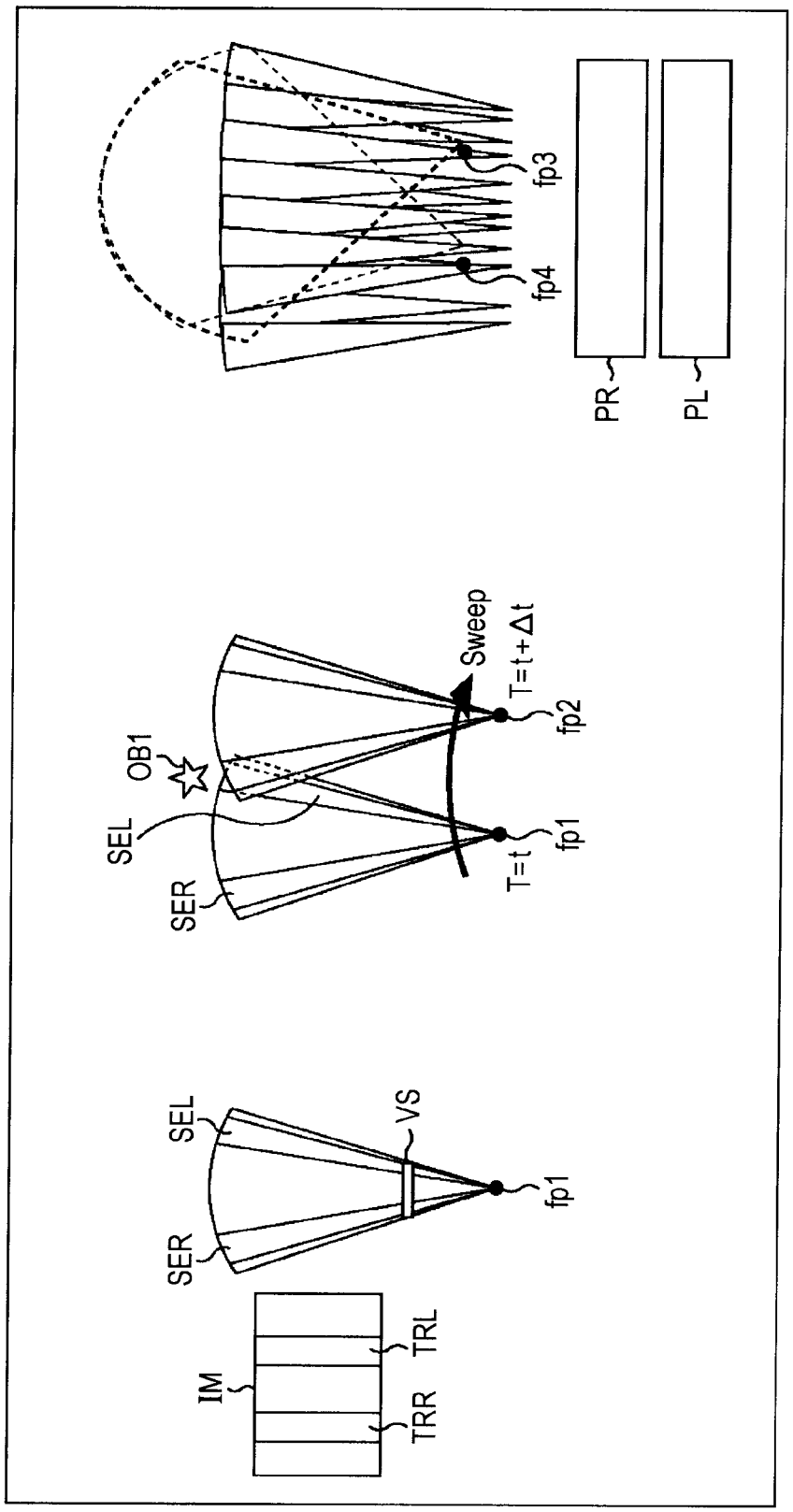
FIG. 1 is a diagram for explaining about a stereoscopic panoramic image.

For example, as shown at the left side in FIG. 1, when a virtual imaging surface VS is captured in the state in which the lens principal point of the imaging apparatus is at a position fp1, a captured image IM is obtained. For example, subjects that exist in a region SER and a region SEL in the real space are respectively displayed in a region TRR and a region TRL in the captured image IM.

Then, when the user causes the imaging apparatus to capture a plurality of captured images while moving the imaging apparatus sideways in FIG. 1, the resulting captured images have disparity. Specifically, as shown at the middle of FIG. 1, when a captured image is captured in the state in which the lens principal point is at the position fp1 at time T=t, and a captured image is captured in the state in which the lens principal point is at a position fp2 at time T=t+Δt, the same subject OB1 is displayed in those captured images. At this time, disparity is produced since the subject OB1 is captured from different positions. By exploiting this, panoramic images in which the same subject is displayed and which have disparity with respect to each other are obtained.

That is, when regions corresponding to the region TRR and the region TRL of the captured image IM are extracted from each of the captured images obtained by capturing with the imaging apparatus while moving the imaging apparatus, and synthesized together, as shown at the right side in FIG. 1, a panoramic image PR and a panoramic image PL are obtained.

Here, the panoramic image PR is an image obtained by arranging and synthesizing regions of the captured images corresponding to the region TRR. This panoramic image PR is an image obtained by capturing the subject with a position fp3 as the position of a virtual lens principal point. On the other hand, the panoramic image PL is an image obtained by arranging and synthesizing regions of the captured images corresponding to the region TRL. This panoramic image PL is an image obtained by capturing the subject with a position fp4 as the position of a virtual lens principal point. Further, the panoramic image PR and the panoramic image PL are images that have disparity with respect to each other and in which the same subject is displayed.

Accordingly, with the panoramic image PR as the image for the right eye, and the panoramic image PL as the image for the left eye, when these panoramic images are displayed simultaneously by the lenticular scheme, a panoramic image that is stereoscopic (hereinafter, also referred to as stereoscopic panoramic image) appears to the eyes of the user.

In this way, when predetermined regions (hereinafter, referred to as strip regions) in a plurality of captured images are extracted, and those partial images are arranged and synthesized together into a single image, a single panoramic image is obtained. Also, when the strip regions are displaced to generate a different panoramic image, a pair of panoramic images having disparity with respect to each other can be obtained. By using those panoramic images, a stereoscopic panoramic image can be displayed.

Figure 2:
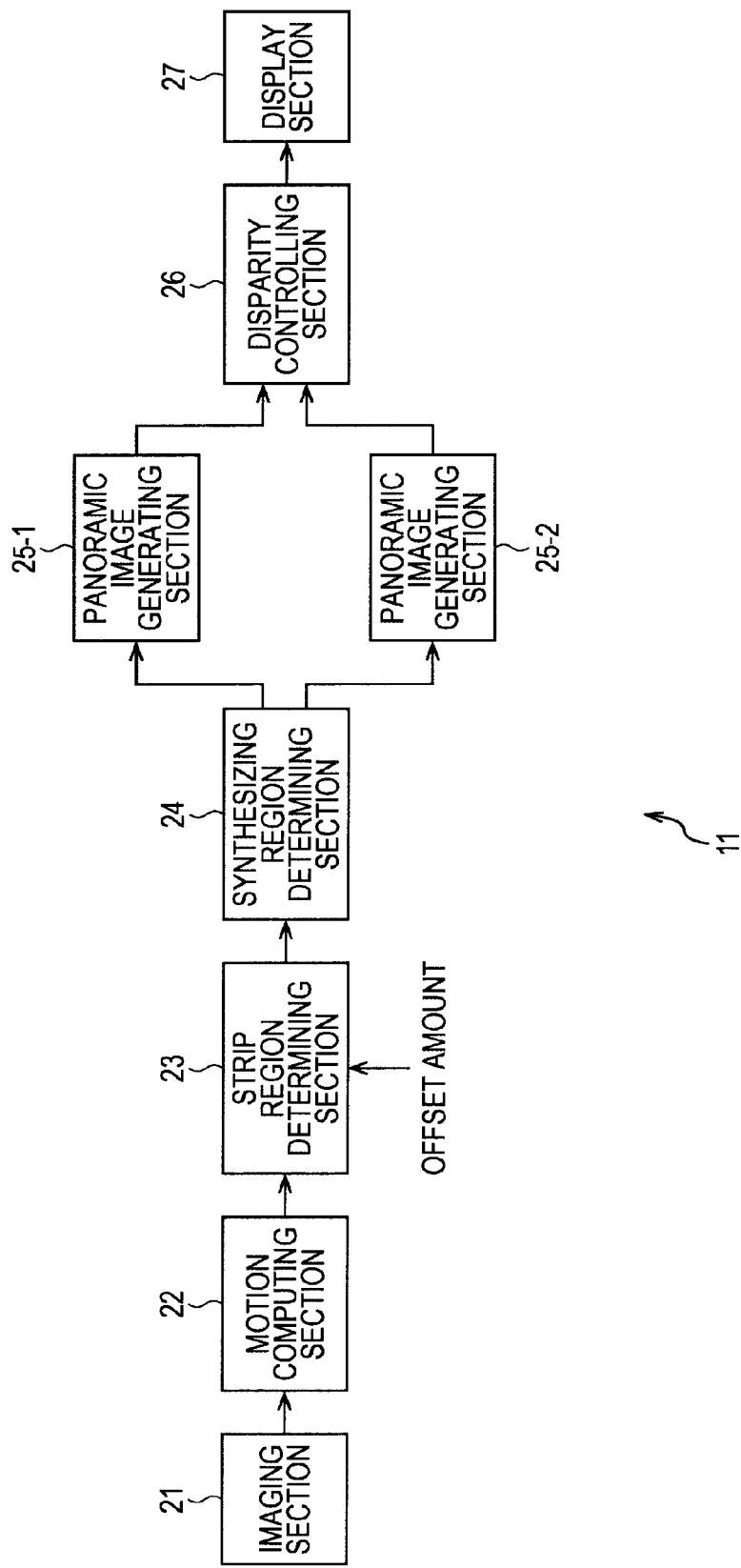
FIG. 2 is a diagram showing an example of the configuration of an embodiment of an imaging apparatus to which the present invention is applied.

[Configuration of Imaging Apparatus]
FIG. 2 is a diagram showing an example of the configuration of an embodiment of an imaging apparatus to which the present invention is applied.

An imaging apparatus 11 includes an imaging section 21, a motion computing section 22, a strip region determining section 23, a synthesizing region determining section 24, a panoramic image generating section 25-1, a panoramic image generating section 25-2, a disparity controlling section 26, and a display section 27.

The imaging section 21 is formed by an optical system such an optical lens, an imaging device, and the like. The imaging section 21 captures the image of a subject by converting light from the subject into an electrical signal, and supplies the captured image obtained as a result to the motion computing section 22.

For example, when the user instructs successive capturing of captured images while moving the imaging apparatus 11 in a predetermined direction, captured images successively captured in time are sequentially supplied to the motion computing section 22. It should be noted that in the following, of the captured images successively captured, the m-th captured image will be referred to as the captured image of Frame m.

The motion computing section 22 computes, on the basis of the captured images supplied from the imaging section 21, motion compensation parameters for compensating for the motion (movement) of the imaging apparatus 11 between frames of the captured images, and supplies the captured images and the motion compensation parameters to the strip region determining section 23.

The motion compensation parameters represent information indicating the relative positional relation between captured images, in the case when a plurality of captured images are arranged individually in the real space in such a way that the same subjects with no motion substantially overlap.

For example, consider a two-dimensional plane defined by a x direction and a y direction that are orthogonal to each other (hereinafter, referred to as projection plane), the x direction being the direction corresponding to the direction in which the user moves the imaging apparatus 11 when capturing captured images. Also, assume that the edges of each captured image are substantially parallel to the x direction and the y direction. In this case, as a motion compensation parameter, the motion computing section 22 computes information indicating the relative positional relation between two adjacent captured images, that is, between the captured images of successive frames when individual captured images are arranged on the projection plane.

It should be noted that in the following, of directions parallel to the x direction, the same direction as the direction of movement of the imaging apparatus 11 will be specifically referred to also as +x direction, and the direction opposite to the +x direction will be referred to also as −x direction. Therefore, when the captured images of individual frames are arranged on the projection plane, the captured image of Frame m is located on the +x direction side with respect to the captured image of Frame (m−1).

The strip region determining section 23 determines strip regions, which are regions in captured images to be extracted for generating panoramic images, on the basis of the captured images and the motion compensation parameters supplied from the motion computing section 22, and an inputted amount of offset.

Here, the strip regions are the region TRR and the region TRL shown in FIG. 1. Two different regions in each captured image are set as the strip regions. For example, two strip regions are set in a single captured image, with TRR being the strip region located on the −x direction side in the captured image, and TRL being the strip region located on the +x direction side.

In such a case, the distance from the strip region TRR to the strip region TRL in the captured image is inputted as an amount of offset to the strip region determining section 23. This amount of offset may be set in advance, or may be variable by the user.

Upon determining the strip regions in individual captured images, the strip region determining section 23 supplies the captured images, the motion compensation parameters, and strip region position information indicating the positions of the strip regions, to the synthesizing region determining section 24.

The synthesizing region determining section 24 determines a synthesizing region on the basis of the captured images, the motion compensation parameters, and the strip region position information supplied from the strip region determining section 23.

In the imaging apparatus 11, strip regions in individual captured images are extracted and synthesized to generate a single panoramic image. Even when the user captures captured images while moving the imaging apparatus 11 in the x direction, the imaging apparatus 11 slightly moves also in the y direction. Consequently, when the captured images are arranged on the projection plane, there are variations in the positions of the captured images with respect to the y direction.

Accordingly, the synthesizing region determining section 24 determines the largest rectangular region inscribed in the region made up of the strip regions of individual captured images when the captured images are arranged on the projection plane, as the synthesizing region from which images used for generation of each panoramic image are extracted. Therefore, when regions included within the synthesizing region are extracted from the strip regions of the individual captured images and synthesized, a panoramic image having a rectangular shape is obtained.

The synthesizing region determining section 24 supplies the determined synthesizing region, that is, synthesizing region information indicating the final corrected positions of the individual strip regions, the captured images, and the motion compensation parameters to the panoramic image generating section 25-1 and the panoramic image generating section 25-2.

The panoramic image generating section 25-1 and the panoramic image generating section 25-2 respectively generates the panoramic image PR and the panoramic image PL by using the synthesizing region information, the captured images, and the motion compensation parameters supplied from the synthesizing region determining section 24, and supplies the panoramic images to the disparity controlling section 26. It should be noted that in the following, where it is not particularly necessary to distinguish between the panoramic image generating section 25-1 and the panoramic image generating section 25-2, the panoramic image generating section 25-1 and the panoramic image generating section 25-2 will be also referred to as panoramic image generating section 25.

The disparity controlling section 26 manipulates the panoramic images supplied from the panoramic image generating section 25 to perform disparity adjustment of the panoramic images, and supplies the pair of panoramic images obtained as a result to the display section 27, thereby displaying a stereoscopic panoramic image.

The display section 27 is formed by, for example, a Liquid Crystal Display (LCD) or a lenticular lens. The display section 27 displays the pair of panoramic images supplied from the disparity controlling section 26 simultaneously by the lenticular scheme, thereby stereoscopically displaying the panoramic images.

[Explanation of Stereoscopic Panoramic Image Display Process]

Incidentally, when the user operates the imaging apparatus 11 to instruct generation of a stereoscopic panoramic image, the imaging apparatus 11 starts a stereoscopic panoramic image display process, which is a process for generating and displaying a stereoscopic panoramic image. Hereinbelow, the stereoscopic panoramic image display process by the imaging apparatus 11 will be described with reference to the flowchart in FIG. 3.

In step S11, the imaging section 21 captures a subject in the state in which the imaging apparatus 11 is moving. For example, the user causes the imaging apparatus 11 to capture a plurality of captured images successively while turning the imaging apparatus 11 in a predetermined direction.

Since light from the subject is incident on the imaging section 21, the imaging section 21 performs photoelectric conversion on the incident light to thereby capture captured images. The obtained captured images are sequentially supplied from the imaging section 21 to the motion computing section 22. It should be noted that each captured image may be a single still image that has been captured, or may be one frame's worth of image that makes up a moving image that has been shot.

In step S12, for each individual captured image supplied from the imaging section 21, the motion computing section 22 computes a motion compensation parameter for the captured image, and supplies the captured images and the motion compensation parameters to the strip region determining section 23.

For example, the motion computing section 22 uses the captured images of two successive frames to compute a global motion vector for each captured image by block matching, as the motion compensation parameter.

That is, the motion computing section 22 splits the captured image of a target frame into a plurality of blocks, and for each of the blocks, performs block matching with the captured image of the frame immediately preceding the target, thereby detecting a motion vector for the block. Then, among the motion vectors determined for each block, the motion vector with the maximum occurrence in terms of magnitude and direction is determined as the global motion vector for the captured image.

A global motion vector is a global motion vector indicating the motion between frames of the entire subject in captured images. Since many of subjects in captured images are stationary objects with no motion in the real space, it can be said that a global motion vector is a vector indicating the motion between frames of a stationary object in captured images, that is, the motion of the imaging apparatus 11 when capturing the captured images.

It should be noted that the motion compensation parameter may alternatively be determined by using an extended affine transformation or the like. For example, in the case of computing the motion compensation parameter by using an extended affine transformation, the motion computing section 22 determines a vector (V, W) indicating the motion between frames of captured images by calculating Equation (1) below, and sets the obtained vector (V, W) as the motion compensation parameter.

[Eq. 1]

$$\begin{pmatrix} V \\ W \end{pmatrix} = \begin{pmatrix} a & b & c & d & e & f \\ g & h & i & j & k & l \end{pmatrix} \begin{pmatrix} x^2 \\ xy \\ y^2 \\ x \\ y \\ 1 \end{pmatrix} \quad (1)$$

$$= \begin{pmatrix} ax^2 + bxy + cy^2 + dx + ey + f \\ gx^2 + hxy + iy^2 + jx + ky + l \end{pmatrix}$$

It should be noted that in Equation (1), a to l each denote an affine parameter, and x and y respectively denote the x component and y component at the center position of a characteristic block in a captured image on the xy-coordinate system.

That is, the motion computing section 22 splits the captured image of a target frame into a plurality of blocks, and for each of the blocks, performs block matching with the captured image of the frame immediately preceding the target, thereby detecting a motion vector for the block. Then, by using a corner detector or the like, the motion computing section 22 determines the reliabilities of the motion vectors of individual blocks, chooses the block with the most reliable motion vector as a characteristic block, and calculates Equation (1) described above.

It should be noted that the affine parameter is computed by the least square method by using the center coordinates of each block, and the motion vector of each block.

In step S13, the strip region determining section 23 determines strip regions in individual captured images, on the basis of the captured images and the motion compensation parameters supplied from the motion computing section 22, and an amount of offset.

Figure 4:
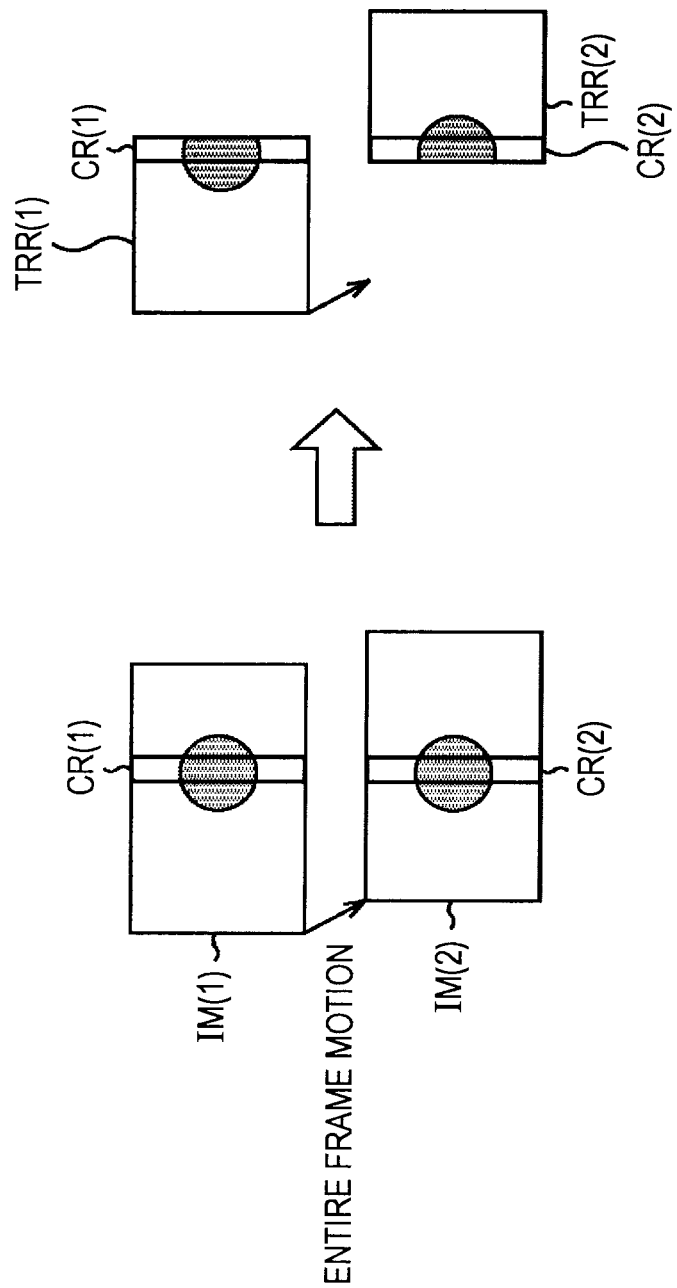
FIG. 4 is a diagram for explaining about strip regions.

For example, as shown at the left side in FIG. 4, the strip region determining section 23 arranges the captured image IM(1) of Frame 1 and the captured image IM(2) of Frame 2 on the projection plane on the basis of the motion compensation parameter. It should be noted that in FIG. 4, in the drawing, the horizontal direction indicates the x direction and, in particular, the rightward direction indicates the +x direction. Also, in FIG. 4, for the ease of description, only the positional relation between captured images in the x direction is shown. In actuality, when the captured images are arranged on the projection plane, those captured images overlap each other.

The strip region determining section 23 determines the position of the center in the x direction of a region where the captured image IM(1) and the captured image IM(2) arranged on the projection plane overlap (hereinafter, referred to as reference position), and further sets as an R reference position a position separated by a specific distance in the −x direction from the reference position. This specific distance is set as, for example, a distance equal to half the amount of offset.

In the captured image IM(1), the strip region determining section 23 sets a region centered at the R reference position and having a predetermined width that is set in advance in the x direction, as an overlapping region CR(1). Also, in the captured image IM(2), the strip region determining section 23 sets a region centered at the R reference position and having a predetermined width that is set in advance in the x direction, as an overlapping region CR(2). Here, the overlapping region CR(1) and the overlapping region CR(2) are regions that overlap each other on the projection plane (the same region).

Then, as shown at the right side in the drawing, the strip region determining section 23 sets, as a strip region TRR(1) of the captured image of Frame 1, the region in the captured image IM(1) from the left edge of the captured image IM(1) to the right edge of the overlapping region CR(1). Likewise, the strip region determining section 23 sets, as a strip region TRR(2) of the captured image of Frame 2, the region in the captured image IM(2) from the left edge of the overlapping region CR(2) to the right edge of the captured image IM(2).

It should be noted that more specifically, from Frame 2 onwards, in setting the strip region TRR of a target frame, the frames preceding and following the frame need to be considered. Therefore, for example, the strip region TRR(m) of Frame m (where m≥2) is set as the region in the captured image from the left edge of the overlapping region with Frame (m−1) to the right edge of the overlapping region with Frame (m+1).

After setting the strip region TRR in each frame in this way, the strip region determining section 23 performs similar processing to set the strip region TRL in each frame. At this time, a position separated by a specific distance in the +x direction, for example, a distance equal to half the amount of offset from the reference position in the captured image is set as an L reference position corresponding to the R reference position. Then, for example, the strip region determining section 23 sets, as the strip region TRL of the captured image of Frame 1, the region in the captured image IM(1) from the left edge of the captured image IM(1) to the right edge of the overlapping region set with respect to the L reference position.

In this way, by setting the R reference position and the L reference position as positions displaced in the x direction from the reference position, the separation between the strip region TRR and the strip region TRL becomes equal to the amount of offset, thereby obtaining panoramic images having disparity with respect to each other.

Figure 3:
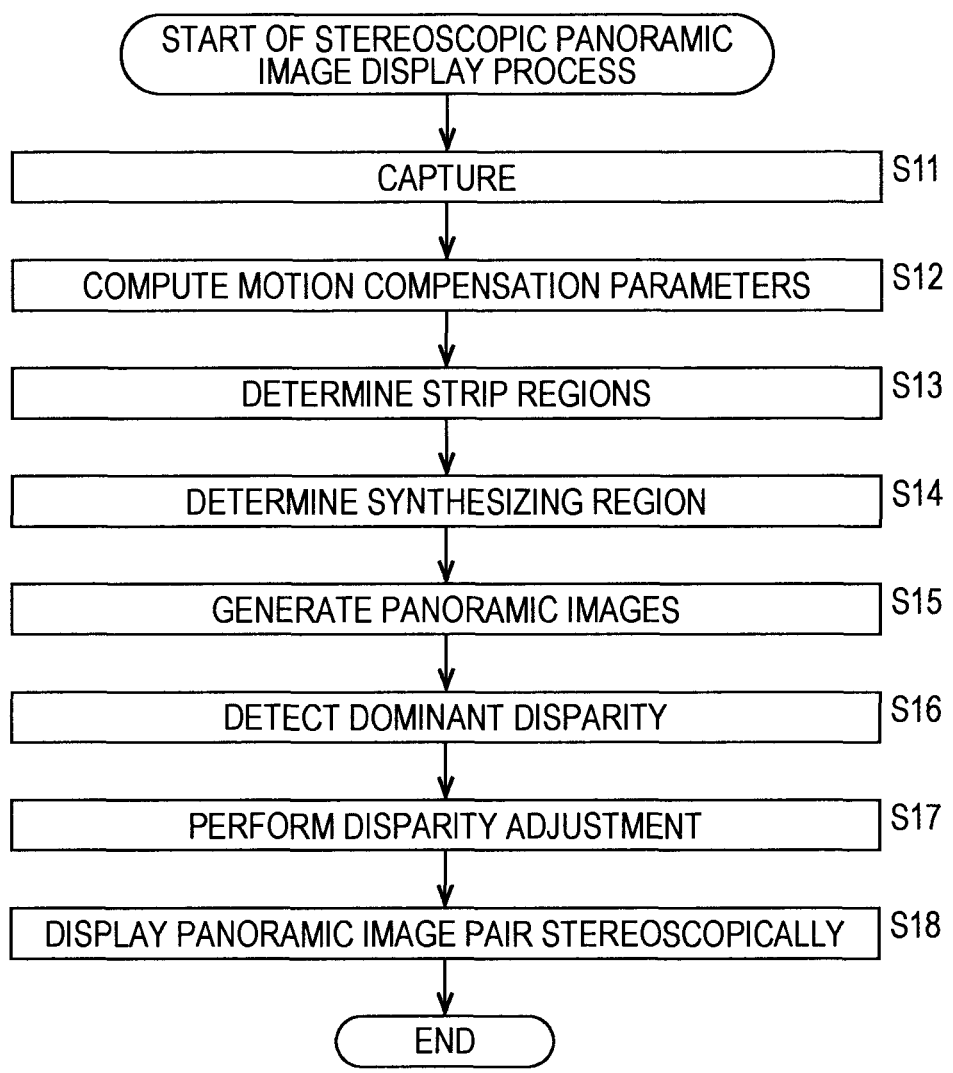
FIG. 3 is a flowchart for explaining a stereoscopic panoramic image display process.

Returning to description of the flowchart in FIG. 3, upon determining the strip regions, the strip region determining section 23 supplies the captured images, the motion compensation parameters, and strip region position information indicating the positions of the strip regions, to the synthesizing region determining section 24.

In step S14, the synthesizing region determining section 24 determines a synthesizing region on the basis of the captured images, the motion compensation parameters, and the strip region position information from the strip region determining section 23, and supplies synthesizing region information indicating the position of the determined synthesizing region, the captured images, and the motion compensation parameters to the panoramic image generating section 25. At this time, synthesizing region information for generating the panoramic image PR is supplied to the panoramic image generating section 25-1, and synthesizing region information for generating the panoramic image PL is supplied to the panoramic image generating section 25-2.

In step S15, the panoramic image generating section 25 generates panoramic images by using the synthesizing region information, the captured images, and the motion compensation parameters from the synthesizing region determining section 24, and supplies the panoramic images to the disparity controlling section 26.

For example, by using the motion compensation parameters, the panoramic image generating section 25-1 arranges captured images on the projection plane in such a way that the same subjects with no motion substantially overlap. Then, the panoramic image generating section 25-1 extracts images within the final strip region TRR of the individual captured images which is indicated by the synthesizing region information, and synthesizes the extracted images to thereby generate the panoramic image PR.

In this way, when the process in step S15 is performed by the panoramic image generating section 25-1 and the panoramic image generating section 25-2, two panoramic images in which a subject viewed from different viewpoints is displayed are obtained. While the same subject is displayed in these panoramic images, this subject has disparity. Consequently, if the two panoramic images are displayed simultaneously, the subject in the panoramic images appears stereoscopically to the user who is observing these panoramic images.

In step S16, the disparity controlling section 26 detects a dominant disparity in the panoramic image pair supplied from the panoramic image generating section 25.

Here, a dominant disparity refers to the disparity that the main subject in panoramic images, that is, the largest subject (having the widest area) has. The disparity controlling section 26 determines disparity for each pixel in the panoramic images, and generates an evaluation value table including the magnitudes of individual disparities, and evaluation values indicating the numbers of pixels in the panoramic images which have the corresponding magnitudes of disparities, thereby determining the dominant disparity.

Figure 5:
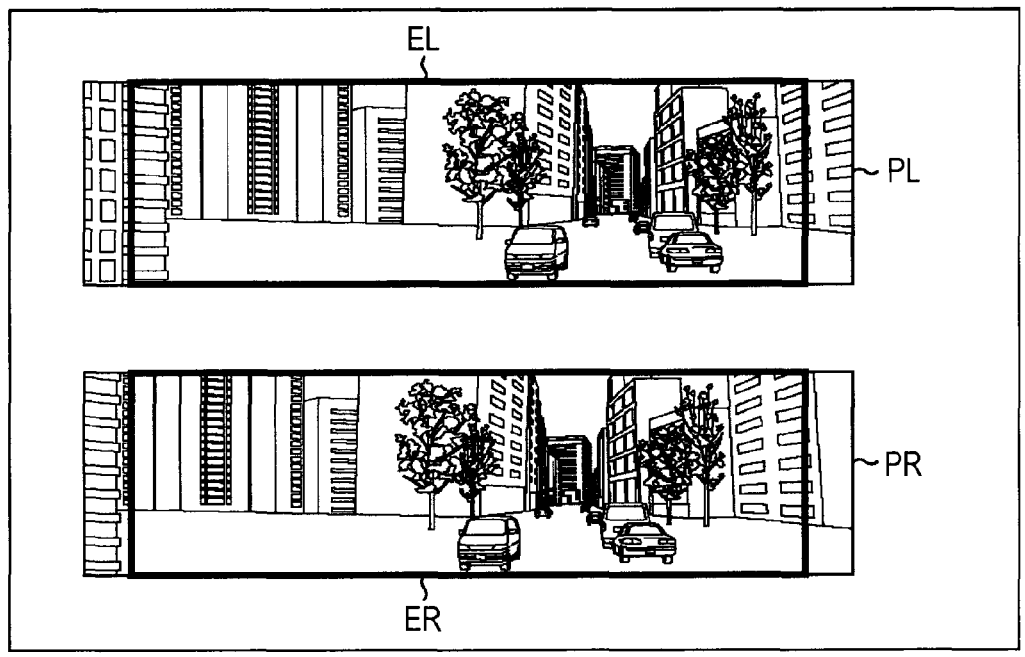
FIG. 5 is a diagram for explaining about detection of a dominant disparity.

Specifically, as shown in FIG. 5, of two panoramic images, the disparity controlling section 26 sets the panoramic image PR generated by each of images extracted from the strip region located on the more −x direction side, as the panoramic image for the right eye, and the other panoramic image PL as the panoramic image for the left eye. It should be noted that in FIG. 5, the horizontal direction and the vertical direction indicate the x direction and the y direction, respectively. In particular, in the drawing, the rightward direction indicates the +x direction.

Here, the panoramic image PR for the right eye refers to the panoramic image that is displayed so as to be observed by the right eye of the user when the panoramic image pair is displayed stereoscopically, and the panoramic image PL for the left eye refers to the panoramic image that is displayed so as to be observed by the left eye of the user.

Also, the disparity controlling section 26 sets an evaluation target region ER and an evaluation target region EL respectively in the panoramic image PR and the panoramic image PL.

The evaluation target region ER is a rectangular region whose center is located at the same position as the center of the panoramic image PR, and which is shorter than the panoramic image PR by a predetermined length in the x direction. Likewise, the evaluation target region EL is a rectangular region whose center is located at the same position as the center of the panoramic image PL, and which is shorter than the panoramic image PL by a predetermined length in the x direction. Also, the evaluation target region ER and the evaluation target region EL are regions of the same size. The disparity controlling section 26 sets pixels located within these evaluation target regions as targets among the pixels in the panoramic images, and determines evaluation values for the individual pixels.

Figure 6:
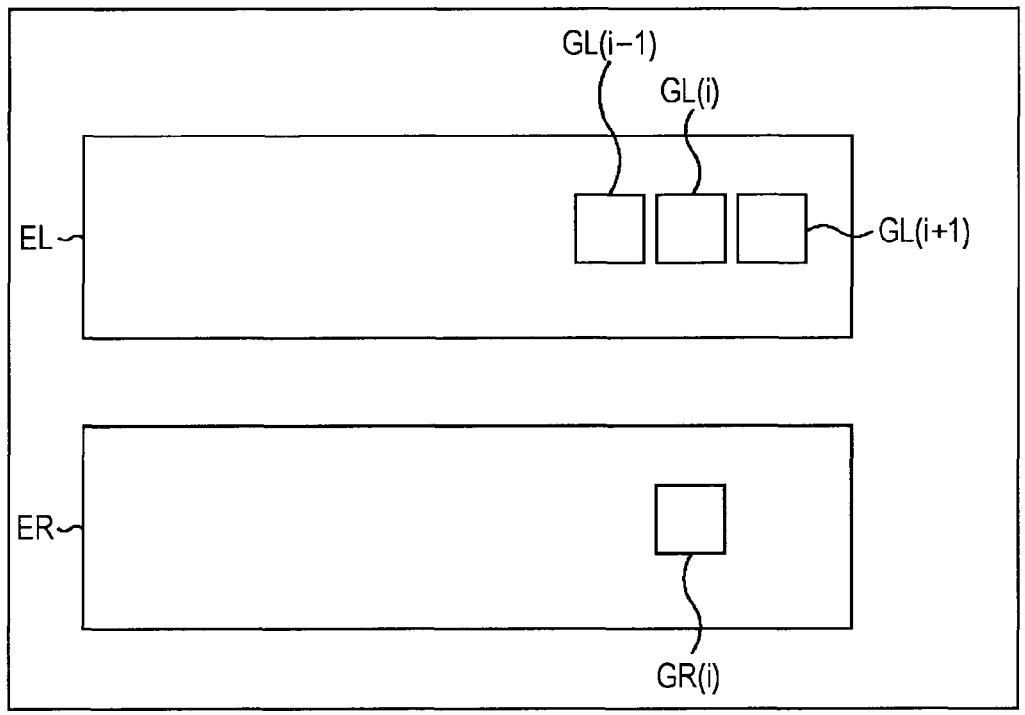
FIG. 6 is a diagram for explaining about detection of a dominant disparity.

First, the disparity controlling section 26 initializes evaluation values for individual disparities in the evaluation value table to "0", and determines the evaluation value for the disparity "0". That is, as shown in FIG. 6, the disparity controlling section 26 sets a predetermined pixel GR(i) within the evaluation target region ER in the panoramic image PR, and a predetermined pixel GL(i) within the evaluation target region EL in the panoramic image PL, as target pixels. It should be noted that the pixel GR(i) and the pixel GL(i) are pixels that are located at the same position when the panoramic image PR and the panoramic image PL are overlaid on top of each other.

Next, the disparity controlling section 26 sets a threshold th by using a pixel GL(i+1) and a pixel GL(i−1) that are adjacent to the pixel GL(i) in the panoramic image PL in the x direction, and the pixel GL(i). That is, the disparity controlling section 26 determines the dynamic range DL in the x direction of the pixel GL(i), by determining the absolute value of the difference between the largest value and the smallest value among the respective pixel values of the pixel GL(i−1), the pixel GL(i), and the pixel GL(i+1).

If the determined dynamic range DL is equal to or larger than a predetermined value that is set in advance, the disparity controlling section 26 sets the threshold th to a specified value that is set in advance, and if the dynamic range DL is less than the predetermined value that is set in advance, the disparity controlling section 26 sets the threshold th to a value smaller than the specified value.

Then, the disparity controlling section 26 determines the absolute value of the difference between the pixel values of the pixel GR(i) and pixel GL(i), and if the determined absolute value is less than the threshold th, the disparity controlling section 26 adds "1" to the evaluation value for the disparity "0" in the evaluation value table. In contrast, if the determined absolute value is equal to or larger than the threshold th, the disparity controlling section 26 keeps the evaluation value for the disparity "0" as it is.

If the absolute value of the difference between the target pixel GR(i) and pixel GL(i) is somewhat small, then the same subject should be displayed in those pixels. Also, since the pixel GR(i) and the pixel GL(i) are pixels that lie at the same position in the panoramic image PR and the panoramic image PL, if the same subject is displayed in those pixels, it follows that the subject does not have disparity. That is, the subject displayed in the pixel GR(i) and the pixel GL(i) is localized on the display screen of the display section 27 when the stereoscopic panoramic image is displayed.

It should be noted that the reason why the threshold th is varied in accordance with the dynamic range DL is to prevent erroneous judgment of the presence/absence of correlation between target pixels. For example, suppose that as a subject, a flat subject (for example, the sky or the like) with little variation in pixel value with respect to the spatial direction is displayed in the portion of the pixel GL(i).

In this case, the pixel values of pixels in the neighborhood of the pixel GL(i) are close to the pixel value of the pixel GL(i), and even if different portions of the subject are displayed in the pixel GR(i) and the pixel GL(i), the absolute value of the difference between those pixels may become less than the threshold th in some cases. That is, erroneous judgment may occur in some cases. Accordingly, when the dynamic range DL is small, the threshold th is set to a value smaller than the normal specified value so that such erroneous judgment becomes less likely to occur.

It should be noted that to prevent erroneous judgment, if the dynamic range DL is less than a predetermined value that is set in advance, the pixel GR(i) and the pixel GL(i) may not be set as targets, and calculation of their difference may not be performed.

In this way, when the difference between pixels set as targets is determined, and "1" is added to the evaluation value in the evaluation value table in accordance with the result of threshold processing with the threshold th, the disparity controlling section 26 selects pixels within the evaluation target region ER and the evaluation target region EL which have not been set as targets yet, and sets the pixels as targets. That is, the absolute value of the difference between the pixels newly set as targets, and the threshold th are compared with each other, and in accordance with the result of the comparison, the evaluation value table is updated.

Then, when all of the pixels within the evaluation target region ER and the evaluation target region EL have been set as targets, the evaluation value for the disparity "0" in the evaluation value table at that time is regarded as the final evaluation value. This evaluation value indicates the number of pixels in which a subject with the disparity "0" is displayed, within the evaluation target region in each panoramic image. In other words, within the evaluation target region in each panoramic image, pixels in which a subject with the disparity "0" is displayed exist as many as the number indicated by the evaluation value.

Further, while displacing the position of the panoramic image PR with respect to the evaluation target region ER, the disparity controlling section 26 determines evaluation values for individual magnitudes of disparities, by setting pixels located at the same position within the evaluation target region ER and the evaluation target region EL as targets. That is, while displacing the position of the panoramic image PR with respect to the panoramic image PL, the disparity controlling section 26 determines the differences between the panoramic images, and determines evaluation values for individual disparities.

Figure 7:
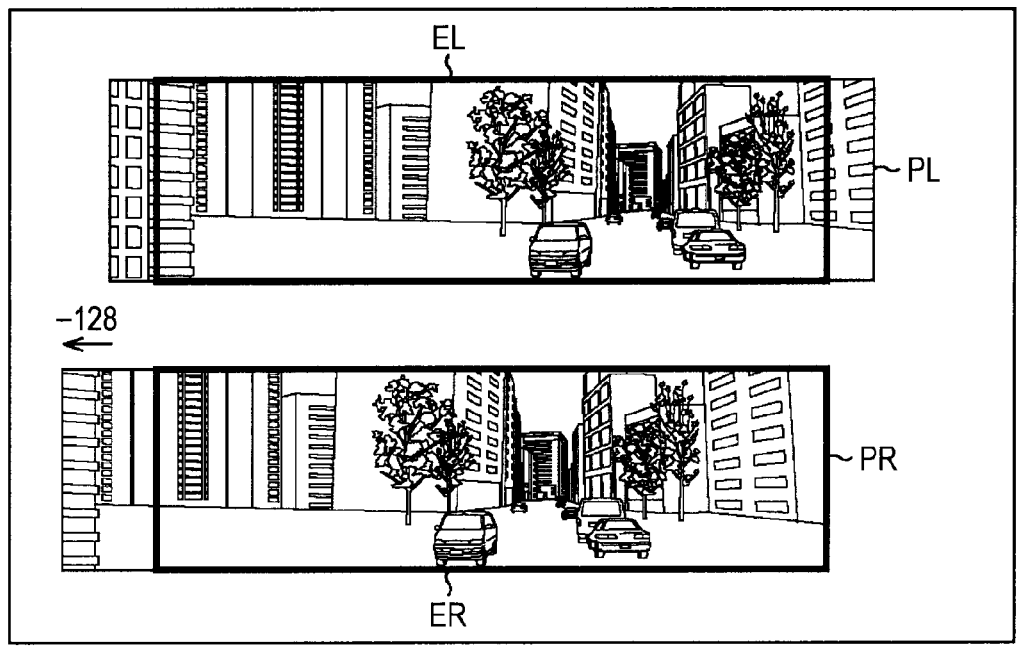
FIG. 7 is a diagram for explaining about detection of a dominant disparity.

For example, as shown in FIG. 7, the disparity controlling section 26 displaces the position of the panoramic image PR in the leftward direction in the drawing with respect to the evaluation target region ER, and determines differences for the pixels within the evaluation target region. It should be noted that in the drawing, the horizontal direction and the vertical direction respectively indicate the x direction and the y direction and, in particular, the rightward direction indicates the +x direction.

In the example in FIG. 7, the panoramic image PR is displaced in the −x direction by 128 pixels with respect to the evaluation target region ER, and the right-side edges of the evaluation target region ER and panoramic image PR are aligned with each other. In this state, the disparity controlling section 26 performs the processing described above with reference to FIG. 5 and FIG. 6. That is, the disparity controlling section 26 determines the absolute value of the difference between pixels in the panoramic image PR and the panoramic image PL which are located at the same position within the evaluation target region, and compares the absolute value with the threshold th. If the absolute value is less than the threshold as a result of the comparison, the disparity controlling section 26 adds "1" to the evaluation value for the disparity "−128" in the evaluation value table, and if the absolute value is equal to or larger than the threshold, the disparity controlling section 26 does not update the evaluation value.

When the evaluation value table is updated by setting all of pixels within the evaluation target region as targets in this way, the final evaluation value for the disparity "−128" is obtained. At the time of updating the evaluation value for the disparity "−128", this process is performed by displacing the panoramic image PR by 128 pixels. Thus, the subject displayed in pixels whose absolute value of difference is less than the threshold is displayed at positions that are separated by 128 pixels between the panoramic image PR and the panoramic image PL. That is, the subject has a disparity equal to 128 pixels. Then, upon display of the stereoscopic panoramic image, the subject displayed in pixels whose disparity is "−128" is localized on the side behind the display screen of the display section 27 as viewed from the user.

Likewise, while displacing the position of the panoramic image PR with respect to the evaluation target region ER also in the direction opposite to that in the example in FIG. 7, the disparity controlling section 26 determines evaluation values for individual magnitudes of disparities, by setting pixels located at the same position within the evaluation target region ER and the evaluation target region EL as targets.

Figure 8:
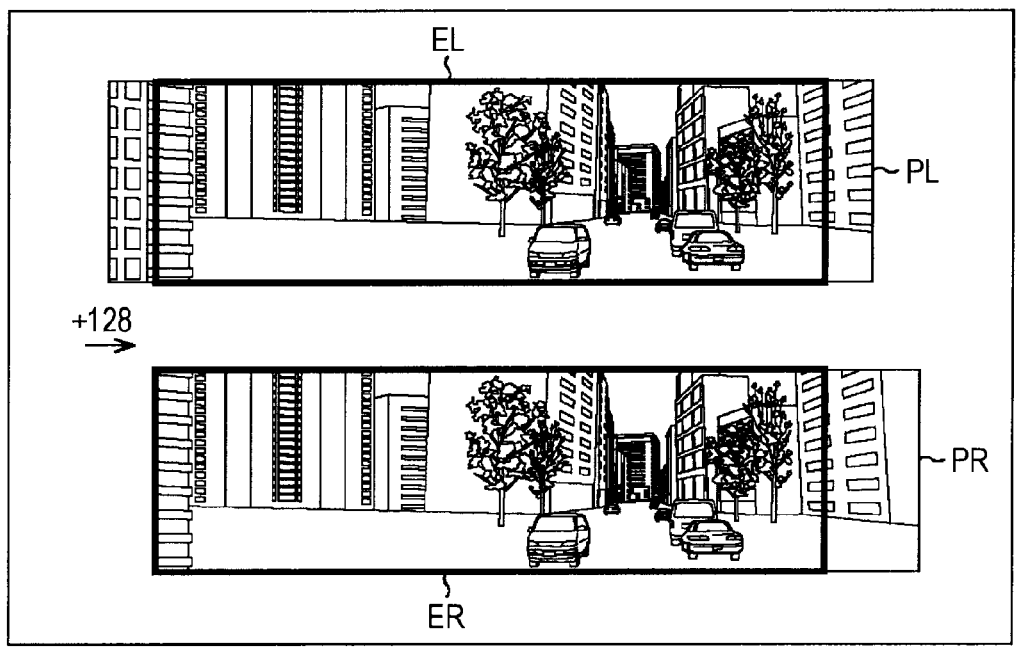
FIG. 8 is a diagram for explaining about detection of a dominant disparity.

For example, as shown in FIG. 8, the disparity controlling section 26 displaces the position of the panoramic image PR in the rightward direction in the drawing with respect to the evaluation target region ER, and determines differences for the pixels within the evaluation target region. It should be noted that in the drawing, the horizontal direction and the vertical direction respectively indicate the x direction and the y direction and, in particular, the rightward direction indicates the +x direction.

In the example in FIG. 8, the panoramic image PR is displaced in the +x direction by 128 pixels with respect to the evaluation target region ER, and the left-side edges of the evaluation target region ER and panoramic image PR are aligned with each other. In this state, the disparity controlling section 26 determines the absolute value of the difference between pixels in the panoramic image PR and the panoramic image PL which are located at the same position within the evaluation target region, and compares the absolute value with the threshold th. If the absolute value is less than the threshold as a result of the comparison, the disparity controlling section 26 adds "1" to the evaluation value for the disparity "128" in the evaluation value table, and if the absolute value is equal to or larger than the threshold, the disparity controlling section 26 does not update the evaluation value.

When the evaluation value table is updated by setting all of pixels within the evaluation target region as targets in this way, the final evaluation value for the disparity "128" is obtained. Upon display of the stereoscopic panoramic image, the subject displayed in pixels whose disparity is "128" is localized on the side in front of the display screen of the display section 27 as viewed from the user.

Upon determining evaluation values for the individual magnitudes of disparities in this way, the disparity controlling section 26 determines, as the dominant disparity of the panoramic images, the disparity with the largest evaluation value among the evaluation values in the evaluation value table. In the evaluation value table, the evaluation value for each disparity represents the number of pixels having the corresponding magnitude of disparity, that is, the size (area) of the region of the subject in the panoramic images. Therefore, it can be said that in the panoramic images, the region (pixels) having the disparity with the largest evaluation value is the widest in area, and the disparity with the maximum evaluation value is the dominant disparity for the subject in the panoramic images.

It should be noted that as the method of determining the dominant disparity of panoramic images, while the description has been given of the case of determining the difference for each pixel in the panoramic images, it suffices to determine a correlation value indicating the degree of correlation between a region in the panoramic image PR and a region in the panoramic image PL, and determine the evaluation value for each individual disparity on the basis of the correlation value. For example, a value based on not the difference for each individual pixel in the panoramic images but the difference for each individual block (for example, the sum of absolute differences between pixels within a block) may be used as the correlation value.

Also, when determining the dominant disparity by using the differences between the panoramic images, the panoramic image PR and the panoramic image PL may be thinned out, and the differences between the thinned out and reduced panoramic images may be determined to determine the dominant disparity.

Returning to the flowchart in FIG. 3, when the disparity controlling section 26 detects the dominant disparity of the panoramic images, the processing proceeds from step S16 to step S17.

In step S17, the disparity controlling section 26 performs disparity adjustment of the panoramic image PR and the panoramic image PL, on the basis of the determined dominant disparity between the panoramic image PR and the panoramic image PL.

That is, the disparity controlling section 26 shifts (moves) the entire panoramic image PR and panoramic image PL by an amount equivalent to the disparity so that the determined dominant disparity is cancelled out. When disparity adjustment is performed by displacing the positions of the entire panoramic images so that the dominant disparity is cancelled out, the dominant disparity between the disparity-adjusted panoramic images becomes "0". Thus, when the panoramic image PR and the panoramic image PL are simultaneously displayed stereoscopically, the main subject in the stereoscopic panoramic image is localized at the position of the display screen of the display section 27.

If the main subject in the stereoscopic panoramic image, that is, a large subject is localized at the position of the display screen of the display section 27, the localized position and the focus position of the user's eyes coincide with each other, thereby eliminating fatigue of the eyes and brain of the user. Moreover, while the main subject in the stereoscopic panoramic image is localized at the position of the display screen, the portions of other subjects are localized on the side in front of or behind the display screen. Thus, the stereoscopic panoramic image is displayed in a sufficiently stereoscopic fashion, and the resulting stereoscopic panoramic image provides natural depth perception (stereoscopic perception).

In this way, by determining the dominant disparity of the panoramic images, and performing disparity adjustment of the panoramic images so that the dominant disparity is cancelled out, a panoramic image pair having more appropriate disparity can be obtained and, as a result, more natural stereoscopic perception can be recreated.

Figure 9:
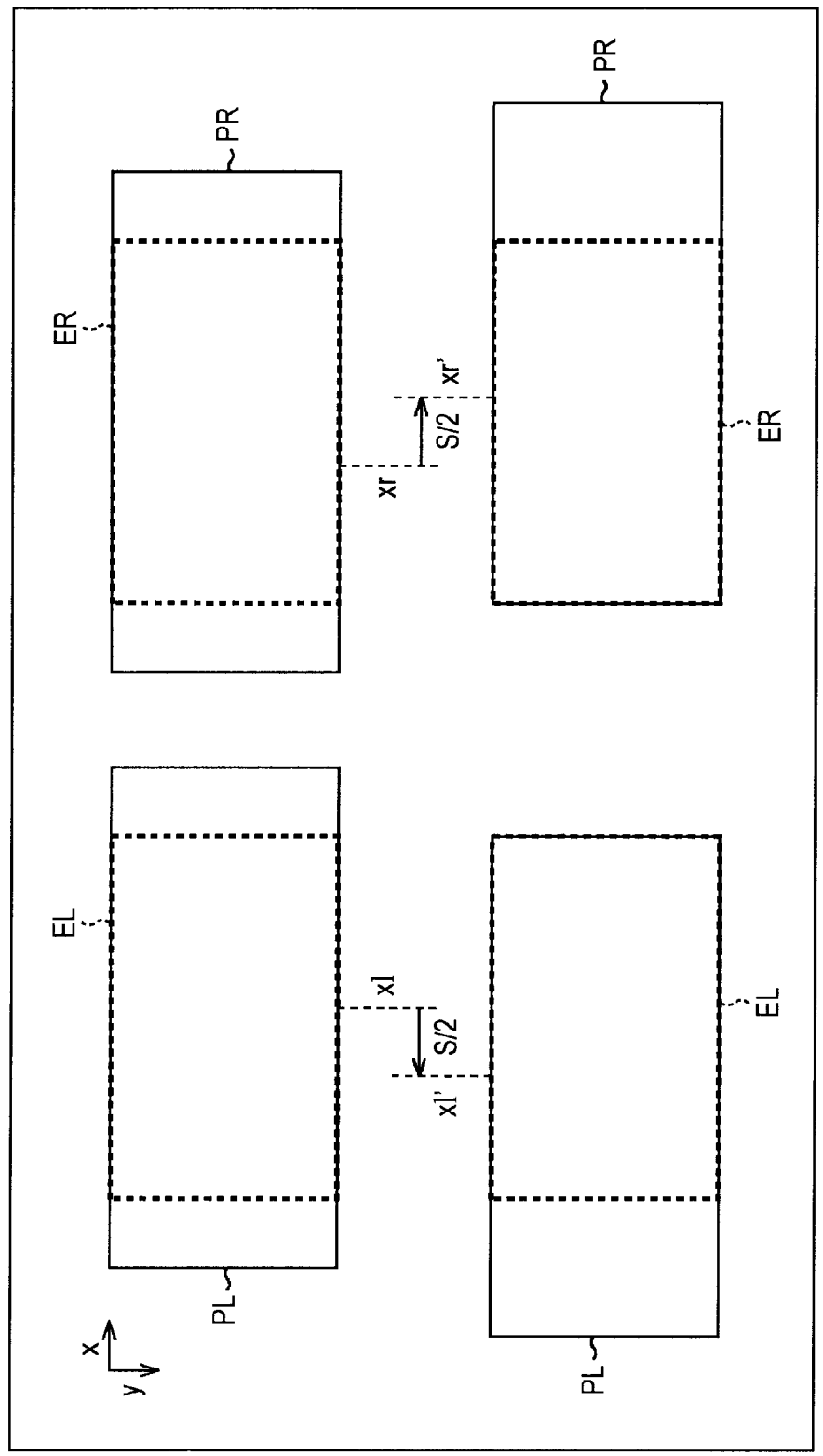
FIG. 9 is a diagram for explaining about disparity adjustment.

For example, as shown in FIG. 9, disparity adjustment of the panoramic images is performed by the panoramic image PR and the panoramic image PL being shifted by an amount of shift determined with respect to the dominant disparity. It should be noted that in the drawing, the horizontal direction and the vertical direction indicate the x direction and the y direction and, in particular, the rightward direction and the downward direction indicate the +x direction and the +y direction, respectively. Also, in FIG. 9, portions corresponding to those in the case in FIG. 8 are denoted by the same symbols, and description thereof is omitted as appropriate.

Now, supposing that Pa is obtained as the dominant disparity of the panoramic image PR and the panoramic image PL, by setting the amount of shift of the panoramic images S=Pa, the disparity controlling section 26 shifts the panoramic image PR in the +x direction by S/2, and the panoramic image PL in the −x direction by S/2.

For example, if the amount of shift S is a positive value (S>0), as shown in FIG. 9, the entire panoramic image PR is shifted by S/2 in the rightward direction (+x direction) with respect to the evaluation target region ER, and the entire panoramic image PL is shifted by S/2 in the leftward direction (−x direction) with respect to the evaluation target region EL. Then, the regions of the panoramic image PR and panoramic image PL which lie within the evaluation target region ER and the evaluation target region EL after the shift are used as the final panoramic image pair for displaying a stereoscopic panoramic image.

If the dominant disparity Pa is a positive value, the main subject in the stereoscopic panoramic image is localized on the side in front of the display screen of the display section 27. Accordingly, by shifting the panoramic image PR and the panoramic image PL away from each other in FIG. 9 so that the disparity becomes small, that is, so that the dominant disparity becomes "0", then the main subject in the shifted panoramic images is localized at the position of the display screen of the display section 27.

Conversely, if the amount of shift S is a negative value (S<0), the entire panoramic image PR is shifted in the leftward direction (−x direction) in the drawing with respect to the evaluation target region ER, and the entire panoramic image PL is shifted in the rightward direction (+x direction) in the drawing with respect to the evaluation target region EL. That is, if the dominant disparity Pa is a negative value, the main subject in the stereoscopic panoramic image is localized on the side behind the display screen. Thus, by shifting the panoramic images toward each other in FIG. 9 so that the disparity becomes larger, the main subject can be localized at the display screen.

The process of shifting the panoramic images described above is explained as follows by using equations. On the xy-coordinate system, letting a target pixel in the panoramic image PR be pr, and a target pixel in the panoramic image PL be pl, the coordinates of those pixels pr and pl are defined as (xr, yr) and (xl, yl), respectively.

Also, letting the amount of shift be S, the disparity controlling section 26 performs disparity adjustment by calculating Equation (2) and Equation (3) below, and moving the pixel pr and the pixel pl to coordinates (xr', yr') and (xl', yl'), respectively.

$$(xr', yr') = (xr + (S/2), yr) \quad (2)$$

$$(xl', yl') = (xl - (S/2), yl) \quad (3)$$

When the display positions of individual pixels in the panoramic images are displaced in this way, a panoramic image pair having more appropriate disparity can be obtained.

Returning to description of the flowchart in FIG. 3, after adjusting the disparity of the panoramic image pair, the disparity controlling section 26 supplies the panoramic image pair obtained as a result to the display section 27, and the processing proceeds to step S18.

In step S18, with the panoramic image pair supplied from the disparity controlling section 26 as the panoramic images for the right eye and the left eye, the display section 27 stereoscopically displays these panoramic images simultaneously by the lenticular scheme. Thus, a stereoscopic panoramic image is displayed on the display screen of the display section 27. When the stereoscopic panoramic image is displayed, the stereoscopic panoramic image display process ends.

In this way, the imaging apparatus 11 determines strip regions in individual captured images on the basis of the amount of offset, and extracts images from the strip regions to generate panoramic images. Then, the imaging apparatus 11 performs disparity adjustment of the obtained panoramic images, and displays the resulting panoramic image pair as a stereoscopic panoramic image.

In this way, with respect to the generated panoramic images, by determining the differences between pixels in the panoramic images, the dominant disparity of the panoramic images can be determined more easily and quickly. When the panoramic images are subjected to a shifting process so as to cancel out the disparity obtained in this way, a panoramic image pair having more appropriate disparity can be obtained. Therefore, when the obtained panoramic image pair is displayed stereoscopically, more natural stereoscopic perception can be recreated.

It should be noted that while it has been described above that disparity adjustment of panoramic images is performed on the basis of the dominant disparity of the panoramic images, it is also possible to use the determined dominant disparity to set the amount of offset anew, and generate the final panoramic image pair from captured images. In this case, strip regions are determined on the basis of the amount of offset that has been set anew, and images in the strip regions are synthesized to generate the final panoramic images.

Second Embodiment

[Explanation of Dominant Disparity]

Incidentally, while it has been described above that the dominant disparity is determined from panoramic images, and disparity adjustment of the panoramic images is performed in accordance with the disparity, it has been confirmed by the present applicant that the absolute value of the dominant disparity of panoramic images is substantially equal to the amount of offset between strip regions.

Figure 10:
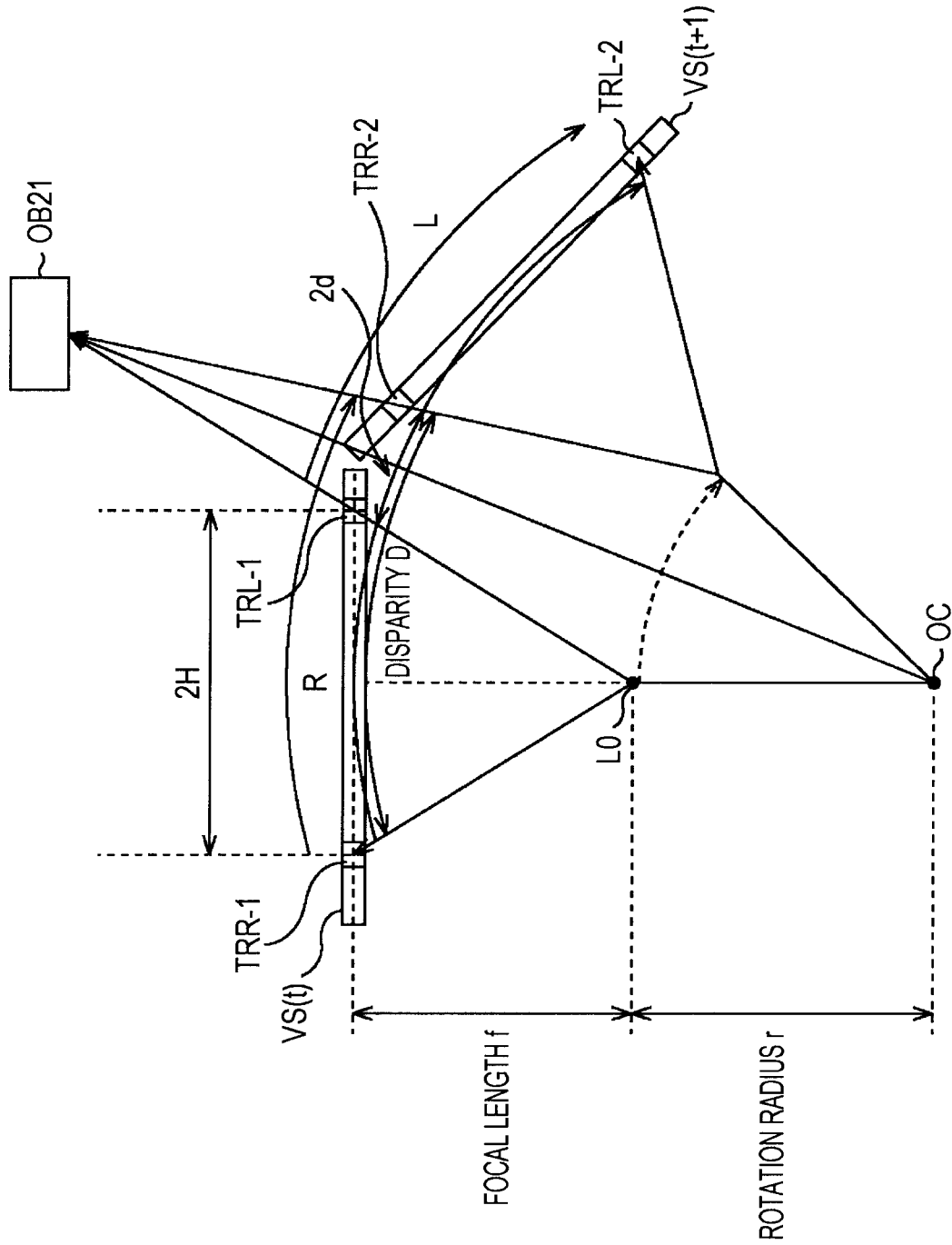
FIG. 10 is a diagram for explaining about the relationship between the amount of offset and disparity.

For example, suppose that as shown in FIG. 10, the user causes the imaging apparatus 11 to capture captured images while moving the imaging apparatus 11 in such a way that the principal point L0 of the lens forming the imaging section 21 turns in the clockwise direction in the drawing about a rotation center OC. Here, let the distance from the principal point L0 of the lens to the rotation center OC, that is, the rotation radius be r, and the focal length of the imaging section 21 be f.

Also, suppose that an imaging surface VS(t) and an imaging surface VS(t+1) are captured successively in time, a region TRR-1 and a region TRL-1 in the imaging surface VS(t) respectively correspond to the strip region TRR and the strip region TRL, and a region TRR-2 and a region TRL-2 in the imaging surface VS(t+1) respectively correspond to the strip region TRR and the strip region TRL. At this time, letting the amount of offset be 2H, the distance between the region TRR-1 and the region TRL-1, and the distance between the region TRR-2 and the region TRL-2 both equal to the amount of offset 2H.

In the example in FIG. 10, the same subject OB21 is displayed in the respective captured images corresponding to the imaging surface VS(t) and the imaging surface VS(t+1), and the subject OB21 is displayed in the respective regions corresponding to the region TRL-1 and the region TRR-2. The actual disparity of the subject OB21 in this case is the distance 2d between the region TRL-1 and the region TRR-2.

Also, when the two panoramic images PR and PL are generated from the captured images captured in the example in FIG. 10, the disparity of those panoramic images is the distance D from the region TRR-1 to the region TRR-2. Then, while this disparity D can be represented by the sum of the distance from the region TRR-1 to the region TRL-1, that is, the amount of offset 2H, and the disparity 2d of the subject OB21, in the case when captured images are captured successively, the disparity 2d becomes an infinitesimal value, and is thus negligible. Therefore, the disparity D of the panoramic images can be approximated by the amount of offset 2H.

As described above, since the disparity D between the panoramic image PR and the panoramic image PL is substantially the same as the amount of offset 2H, when disparity adjustment of the panoramic images is performed on the basis of the amount of offset, appropriate disparity control can be performed even without determining the dominant disparity of the panoramic images.

[Explanation of Stereoscopic Panoramic Image Display Process]

In the case where the imaging apparatus 11 performs disparity adjustment of panoramic images on the basis of an amount of offset, the amount of offset is supplied to not only the strip region determining section 23 but also the disparity controlling section 26.

Figure 11:
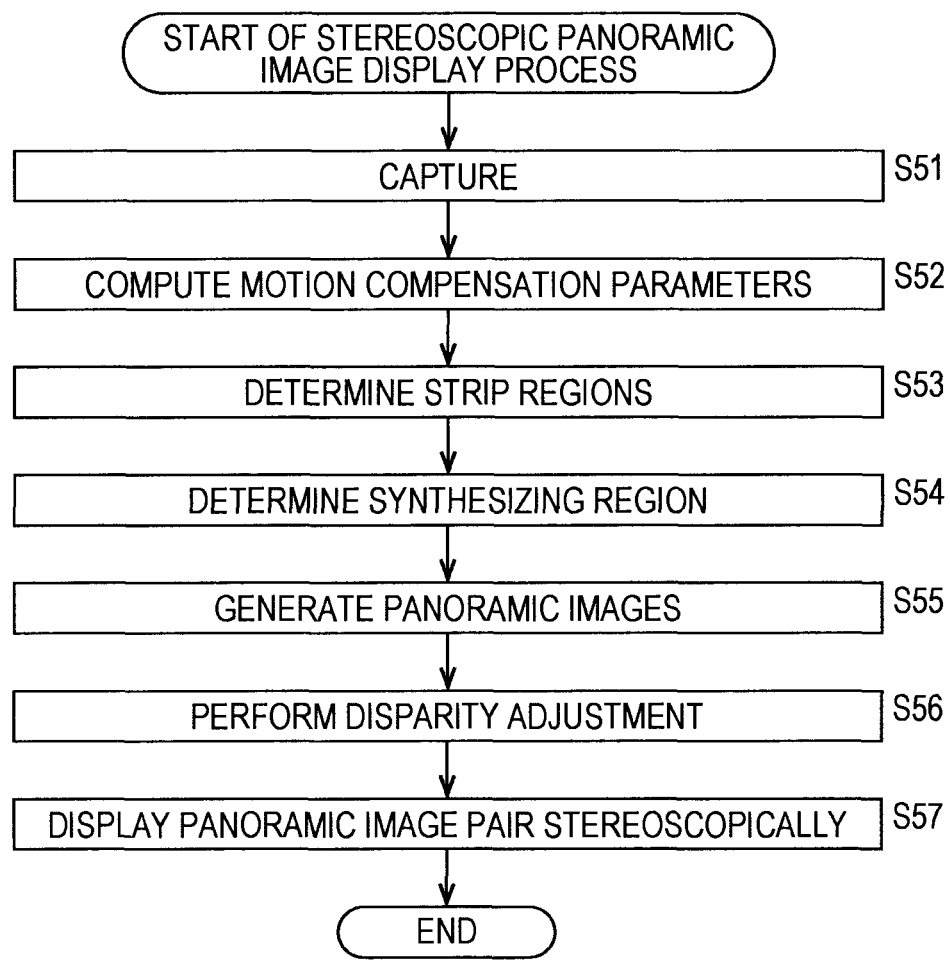
FIG. 11 is a flowchart for explaining a stereoscopic panoramic image display process.

Hereinbelow, referring to the flowchart in FIG. 11, a description will be given of a stereoscopic panoramic image display process performed by the imaging apparatus 11 in such a case.

It should be noted that since the processes in step S51 to step S55 are the same as the processes in step S11 to step S15 in FIG. 3, description thereof is omitted. That is, captured images are captured, and the panoramic image PR and the panoramic image PL are generated from those captured images.

In step S56, the disparity controlling section 26 performs disparity adjustment of the panoramic image PR and the panoramic image PL supplied from the panoramic image generating section 25, by using the inputted amount of offset 2H.

That is, by setting the amount of shift of the panoramic images S=−2H, the disparity controlling section 26 adjusts the disparity of the panoramic image PR and the panoramic image PL by performing the same processing as the processing described above with reference to FIG. 9. That is, the panoramic image PR and the panoramic image PL are each shifted by S/2 in the x direction.

Then, in step S57, using the panoramic image pair supplied from the disparity controlling section 26 as the panoramic images for the right eye and the left eye, the display section 27 stereoscopically displays these panoramic images simultaneously by the lenticular scheme, and the stereoscopic panoramic image display process ends.

In this way, the imaging apparatus 11 performs disparity adjustment of panoramic images on the basis of the amount of offset, and displays the panoramic image pair as a stereoscopic panoramic image.

A panoramic image pair having more appropriate disparity can be obtained also by performing disparity adjustment of panoramic images by using the amount of offset in this way, and a stereoscopic panoramic image that provides more natural stereoscopic perception can be displayed. In this case, disparity can be adjusted quickly through simpler processing than in the case of determining the dominant disparity.

It should be noted that while it is been described above that the amount of shift is set to be the same as the amount of offset, a value obtained by slightly increasing or decreasing the amount of offset may be used as the amount of shift.

Also, while it has been described that two different regions in each captured image are set as strip regions, three or more regions on a single captured image which are different from each other may each be set as a strip region. In such a case, panoramic images are generated for each of those strip regions. These plurality of panoramic images are used for displaying, for example, a multi-viewpoint stereoscopic panoramic image. For example, by displaying several of the plurality of panoramic images simultaneously by the lenticular scheme, a panoramic image whose disparity varies depending on the viewpoint from which to view the display section 27 can be displayed. Even in this case, the imaging apparatus 11 can perform disparity adjustment for each pair of panoramic images.

Further, while it has been described that both the panoramic image PR and the panoramic image PL are shifted to thereby perform disparity adjustment of those panoramic images, it suffices that disparity be adjusted by shifting at least one of the panoramic image PR and the panoramic image PL. That is, for example, disparity can be adjusted by shifting only the panoramic image PR by the amount of shift S.

Further, while the above description is directed to the case in which a stereoscopic panoramic image is displayed, the stereoscopic image to be displayed may not necessarily have a field of view wider than that of captured images. For example, a stereoscopic image with the same field of view as that of captured images may be displayed. In such a case, the field of view of the generated panoramic images is set to be the same as the field of view of the captured images.

It should be noted that the series of processes described above can be either executed by hardware or executed by software. If the series of processes is to be executed by software, a program constituting the software is installed into a computer embedded in dedicated hardware, or into, for example, a general-purpose personal computer that can execute various kinds of functions when installed with various kinds of programs, from a program-recording medium.

Figure 12:
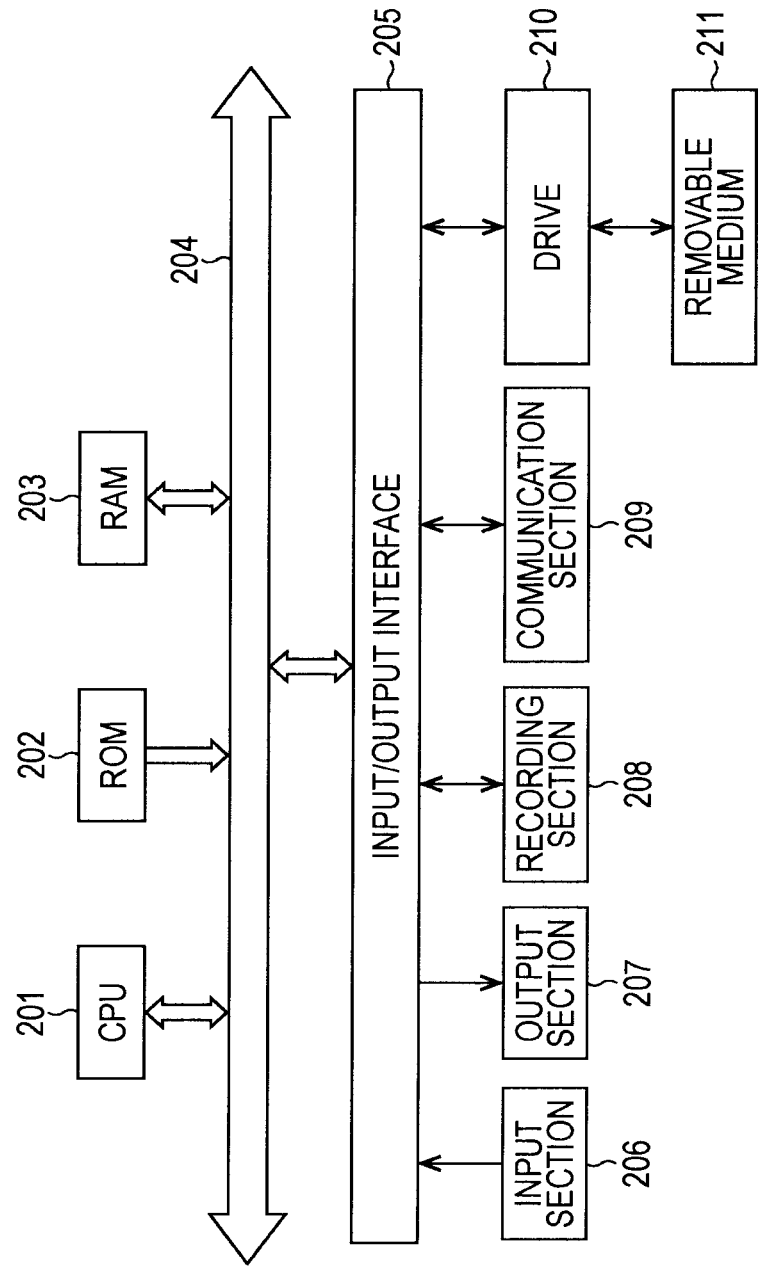
FIG. 12 is a diagram showing an example of the configuration of a computer.

FIG. 12 is a block diagram showing an example of the hardware configuration of a computer that executes the above-mentioned series of processes by a program.

In the computer, a Central Processing Unit (CPU) 201, a Read Only Memory (ROM) 202, and a Random Access Memory (RAM) 203 are connected to each other via a bus 204.

The bus 204 is further connected with an input/output interface 205. The input/output interface 205 is connected with an input section 206 formed by a keyboard, a mouse, a microphone, or the like, an output section 207 formed by a display, a speaker, or the like, a recording section 208 formed by a hard disk, a non-volatile memory, or the like, a communication section 209 formed by a network interface or the like, and a drive 210 for driving a removable medium 211 such as a magnetic disc, an optical disc, a magneto-optical disc, or a semiconductor memory.

In the computer configured as described above, the above-mentioned series of processes is performed when, for example, the CPU 201 loads a program recorded in the recording section 208 into the RAM 203 via the input/output interface 205 and the bus 204, and executes the program.

The program executed by the computer (CPU 201) is provided by being recorded on the removable medium 211 that is a packaged medium formed by, for example, a magnetic disc (including a flexible disc), an optical disc (such as a Compact Disc-Read Only Memory (CD-ROM) or a Digital Versatile Disc (DVD)), a magneto-optical disc, a semiconductor memory, or the like, or via a wired or wireless transmission medium such as a local area network, the Internet, or digital satellite broadcast.

Then, the program can be installed into the recording section 208 via the input/output interface 205, by inserting the removable medium 211 in the drive 210. Also, the program can be received by the communication section 209 via a wired or wireless transmission medium, and installed into the recording section 208. Alternatively, the program can be pre-installed into the ROM 202 or the recording section 208.

It should be noted that the program executed by the computer may be a program in which processes are performed in a time-series fashion in the order as described in this specification, or may be a program in which processes are performed in parallel, or at necessary timing such as when invoked.

It should be noted that embodiments of the present invention are not limited to the above-described embodiments, and various modifications are possible without departing from the scope of the present invention.

| Reference Signs List | |
|---|---|
| 11 | imaging apparatus |
| 21 | imaging section |
| 22 | motion computing section |
| 23 | strip region determining section |
| 24 | synthesizing region determining section |
| 25-1, 25-2, 25 | panoramic image generating section |
| 26 | disparity controlling section |
| 27 | display section |

The invention claimed is:

1. An image processing apparatus which generates a first synthetic image and a second synthetic image used for displaying a stereoscopic synthetic image and having disparity with respect to each other, on the basis of a plurality of captured images obtained by capturing with imaging means while moving the imaging means, comprising:
- a first synthetic image generating means for generating the first synthetic image by synthesizing each of images in a first strip region of the captured images;
- a second synthetic image generating means for generating the second synthetic image by synthesizing each of images in a second strip region of the captured images which is different from the first strip region; and
- disparity controlling means for adjusting the disparity of the first synthetic image and the second synthetic image, by shifting at least one of the first synthetic image and the second synthetic image on the basis of a predetermined amount of shift,
- wherein the disparity controlling means computes a correlation value indicating a degree of correlation between a region in the first synthetic image and a region in the second synthetic image, detects a dominant disparity of the first synthetic image and the second synthetic image by using the correlation value, and computes the amount of shift that cancels out the dominant disparity.

2. The image processing apparatus according to claim 1, wherein the disparity controlling means computes a difference between the first synthetic image and the second synthetic image as the correlation value, while displacing a position of the second synthetic image with respect to the first synthetic image.

3. The image processing apparatus according to claim 1, wherein the disparity controlling means computes the amount of shift on the basis of a distance between the first strip region and the second strip region in each of the captured images.

4. An image processing method for an image processing apparatus that generates a first synthetic image and a second synthetic image used for displaying a stereoscopic synthetic image and having disparity with respect to each other, on the basis of a plurality of captured images obtained by capturing with imaging means while moving the imaging means, the image processing apparatus including
- a first synthetic image generating means for generating the first synthetic image by synthesizing each of images in a first strip region of the captured images,
- a second synthetic image generating means for generating the second synthetic image by synthesizing each of images in a second strip region of the captured images which is different from the first strip region, and
- disparity controlling means for adjusting the disparity of the first synthetic image and the second synthetic image, by shifting at least one of the first synthetic image and the second synthetic image on the basis of a predetermined amount of shift, the image processing method comprising the steps of:
  - the first synthetic image generating means generating the first synthetic image by synthesizing each of the images in the first strip region of the captured images;
  - the second synthetic image generating means generating the second synthetic image by synthesizing each of the images in the second strip region of the captured images; and
  - the disparity controlling means adjusting the disparity of the first synthetic image and the second synthetic image on the basis of the amount of shift,
- wherein the disparity controlling means computes a correlation value indicating a degree of correlation between a region in the first synthetic image and a region in the second synthetic image, detects a dominant disparity of the first synthetic image and the second synthetic image by using the correlation value, and computes the amount of shift that cancels out the dominant disparity.

5. A non-transitory, computer-readable medium comprising instructions that, when executed, cause a computer to execute processing, the computer controlling an image processing apparatus that generates a first synthetic image and a second synthetic image used for displaying a stereoscopic synthetic image and having disparity with respect to each other, on the basis of a plurality of captured images obtained by capturing with imaging means while moving the imaging means, the processing including the steps of:
- generating the first synthetic image by synthesizing each of images in a first strip region of the captured images;
- generating the second synthetic image by synthesizing each of images in a second strip region of the captured images which is different from the first strip region; and
- adjusting the disparity of the first synthetic image and the second synthetic image, by shifting at least one of the first synthetic image and the second synthetic image on the basis of a predetermined amount of shift,
- wherein adjusting the disparity further comprises computing a correlation value indicating a degree of correlation between a region in the first synthetic image and a region in the second synthetic image, detecting a dominant disparity of the first synthetic image and the second synthetic image by using the correlation value, and computing the amount of shift that cancels out the dominant disparity.

6. The image processing method of claim 4, wherein the disparity controlling means computes a difference between the first synthetic image and the second synthetic image as the correlation value, while displacing a position of the second synthetic image with respect to the first synthetic image.

7. The non-transitory, computer-readable medium of claim 6, wherein adjusting the disparity further comprises computing a difference between the first synthetic image and the second synthetic image as the correlation value, while displacing a position of the second synthetic image with respect to the first synthetic image.

* * * * *